United States Patent
Wienecke

(10) Patent No.: US 6,929,088 B2
(45) Date of Patent: Aug. 16, 2005

(54) POWER STEERING SYSTEM

(75) Inventor: Ulrich Wienecke, Aachen (DE)

(73) Assignee: TRW Fahrwerksysteme GmbH & Co. KG (DE)

( * ) Notice: Subject to any disclaimer, the term of this patent is extended or adjusted under 35 U.S.C. 154(b) by 0 days.

(21) Appl. No.: 10/353,366

(22) Filed: Jan. 29, 2003

(65) Prior Publication Data

US 2003/0141140 A1 Jul. 31, 2003

(30) Foreign Application Priority Data

Jan. 29, 2002 (DE) .......................... 102 03 384

(51) Int. Cl.⁷ .............................................. B62D 5/06
(52) U.S. Cl. .................. 180/441; 180/442; 91/375 A; 91/375 R; 137/625.31
(58) Field of Search ................. 180/441, 442; 91/375 A, 375 R, 380; 137/15.21, 625.21–625.24, 543.23

(56) References Cited

U.S. PATENT DOCUMENTS

| | | | | |
|---|---|---|---|---|
| 4,367,672 A | * | 1/1983 | Elser .......................... 91/375 A |
| 4,715,464 A | * | 12/1987 | Nakamura et al. ........... 180/441 |
| 5,332,000 A | * | 7/1994 | Gassner ................. 137/543.23 |
| 5,339,917 A | | 8/1994 | Eberhart ...................... 180/143 |
| 5,346,175 A | * | 9/1994 | Hunnicutt ............... 251/129.08 |
| 5,396,969 A | * | 3/1995 | Joerg et al. .................. 180/417 |
| 5,462,413 A | * | 10/1995 | Schroeder ................... 417/310 |
| 5,531,286 A | * | 7/1996 | Majer et al. ................. 180/441 |
| 5,538,096 A | * | 7/1996 | Breitweg ..................... 180/429 |
| 5,593,002 A | * | 1/1997 | Okada et al. ............... 180/421 |
| 5,769,121 A | * | 6/1998 | Breitweg ............... 137/625.23 |
| 5,862,879 A | * | 1/1999 | Eberhart ..................... 180/422 |
| 5,964,314 A | * | 10/1999 | Suzuki et al. ............... 180/400 |
| 6,082,242 A | * | 7/2000 | Suzuki ..................... 91/375 A |
| 6,148,947 A | * | 11/2000 | Eberhart et al. ............. 180/441 |
| 6,250,334 B1 | * | 6/2001 | Abraham et al. ...... 137/625.23 |
| 6,267,133 B1 | * | 7/2001 | Hofmann et al. ........ 137/15.21 |
| 6,276,487 B1 | * | 8/2001 | Bieber et al. ............... 180/426 |
| 6,298,940 B1 | * | 10/2001 | Bohner et al. .............. 180/403 |
| 6,520,278 B2 | * | 2/2003 | Wang ......................... 180/421 |

FOREIGN PATENT DOCUMENTS

EP 0 551 619 7/1993

* cited by examiner

Primary Examiner—Lesley D. Morris
Assistant Examiner—L. Lum
(74) Attorney, Agent, or Firm—MacMillan, Sobanski & Todd, LLC

(57) ABSTRACT

A power steering system includes a rotary slide valve which has a housing, an input shaft and an output shaft which can be rotated relative to each other to a limited extent. A centering piston is provided which is non-rotatably and axially movably connected with the input shaft and delimits a pressure space in the housing. The rotary slide valve further comprises a centering ring which is non-rotatably connected with the output shaft, and arm inlet to the pressure chamber. The pressure chamber has a controlled outlet. There is also proposed a method of operating such a power steering system.

13 Claims, 4 Drawing Sheets

POWER STEERING SYSTEM

CROSS REFERENCE TO RELATED APPLICATIONS

This application claims priority of German Patent Application No. 102 03 384.6 filed Jan. 29, 2002, the disclosure of which is incorporated herein by reference.

TECHNICAL FIELD

This invention relates to a power steering system comprising a rotary slide valve, and to a method of operating such a power steering steering system.

BACKGROUND OF THE INVENTION

Conventional rotary slide valves for use in a power steering system have a housing, an input shaft and an output shaft which can be rotated relative to each other to a limited extent, a centering piston which is non-rotatably and axially movably connected with the input shaft and delimits a pressure chamber in the housing, a centering ring which is non-rotatably connected with the output shaft, and an inlet to the pressure chamber.

Such an arrangement is known from European patent document 0 551 619 B 1, and U.S. Pat. No. 5,339,917 which is hereby incorporated by reference. The centering piston serves to provide a centering or restoring force, i.e. to urge the input shaft and the output shaft relative to each other into a neutral position in which no power assistance is provided. In the known construction, the centering piston is urged against the centering ring by a pressure spring. Unless any further pressure forces act on the centering piston, the same thus generates a firm centering dependent on the spring action. If a stronger centering is desired, for instance at high driving speeds, pressure is applied on the pressure space, so that a stronger centering effect is achieved. As a result of this stronger centering effect, a higher torque must be applied on the steering wheel connected with the input shaft, in order to obtain a defined rotation between input shaft and output shaft and thus of the rotary slide valve. If, on the other hand, a particularly small steering moment is desired, in order to generate a predetermined power assistance, for instance when parking the vehicle during standstill, it is provided according to the known construction to apply pressure on the side of the centering piston opposite the pressure space, in order to generate a force acting against the spring force.

It is the object underlying the invention to develop a power steering system as mentioned above such that with a simpler mechanical structure largely any desired centering effect can be caused.

BRIEF SUMMARY OF THE INVENTION

According to the invention, a power steering system comprises a rotary slide valve which has a housing, an input shaft and an output shaft which can be rotated relative to each other to a limited extent. A centering piston is provided which is non-rotatably and axially movably connected with the input shaft and delimits a pressure space in the housing. The rotary slide valve further comprises a centering ring which is non-rotatably connected with the output shaft, and an inlet to the pressure chamber. The pressure chamber has a controlled outlet. The pressure in the pressure chamber can thus be controlled such that the spring can be omitted, which in the known construction has urged the centering piston against the centering ring; by closing the outlet from the pressure chamber, the pressure in the pressure chamber can be maintained at such a minimum pressure that the basic bias between centering piston and centering ring, which so far has been provided in a mechanical way, is now provided in a hydraulic way. This basic bias preferably is chosen so small that the application of pressure on the rear side of the centering piston, which is provided in the known construction, can now be omitted. It may at best be required to provide an auxiliary spring instead of the pressure spring provided in the known construction, which auxiliary spring ensures a defined arrangement of the centering piston relative to the centering ring in the pressureless condition of the power steering system, but is dimensioned so weak that its contribution to the centering effect is negligible.

In the outlet of the pressure chamber there is preferably provided a cut-off valve, which opens the outlet only as of a first pressure threshold which is larger than zero. For this purpose, the cut-off valve can have a valve element which is urged against a valve seat by a spring, the valve element being guided in a guideway downstream of the valve seat, a passage of defined cross-section being formed between the valve element and the guideway, and the valve element being mounted such that it can be pressed out of the guideway. As long as a pressure smaller than the first pressure threshold exists in the pressure chamber, the valve element of the cut-off valve rests against the valve seat; the outlet from the pressure chamber is closed. Upon exceeding the first pressure threshold, the valve element is lifted off its valve seat, so that a discharge from the pressure chamber is possible through the passage of defined cross-section. In this way, the pressure in the pressure chamber is maintained at a level which is approximately constant over a large range of flow rates. Only if the pressure in the pressure chamber exceeds a second pressure threshold, is the valve element displaced to such an extent that it moves out of the guideway. In this condition, the discharge from the pressure chamber is no longer possible through the passage of defined cross-section, but through a very much larger cross-section in the vicinity of the guideway.

Preferably, the inlet to the pressure chamber is provided with a flow or pressure control valve. In this way, part of the hydraulic stream provided by a hydraulic pump for power assistance can be branched off, which part is then directly used for acting on the pressure chamber.

If no spring is arranged in the pressure chamber, the centering piston can be connected with the input shaft by metal bellows. Metal bellows represent a very simple and inexpensive solution, in order to non-rotatably, but axially movably connect the centering piston with the input shaft. The metal bellows can act as auxiliary spring due to their spring action and bias.

Preferably, the centering ring is press-fitted to a valve sleeve which is connected with the output shaft. It is thus possible to safely and reliably firmly connect the centering ring with the valve sleeve with a minimum effort in any position that corresponds to a correct central position of the rotary slide valve.

For the solution of the above-mentioned object there is also provided a method of operating a power steering system, which is distinguished in that the centering piston is urged against the centering ring by a force which substantially results from the difference between the pressure in the pressure chamber and the return pressure on the side of the centering piston facing the centering balls, the cut-off valve only opening the outlet from the pressure space when the pressure in the pressure space exceeds a first pressure threshold. This first pressure threshold may be about 1 bar. Preferably, the centering piston is designed such that with this pressure difference of about 1 bar, which exists between the pressure chamber and the rear side of the centering piston, a torque of about 0.85 Nm is achieved between centering piston and centering ring. This torque approximately corresponds to the torque achieved in a conventional system due to the mechanical application of a spring force on the centering piston.

Advantageous aspects of the invention can be taken from the sub-claims.

DETAILED DESCRIPTION OF THE INVENTION

Figure 1:
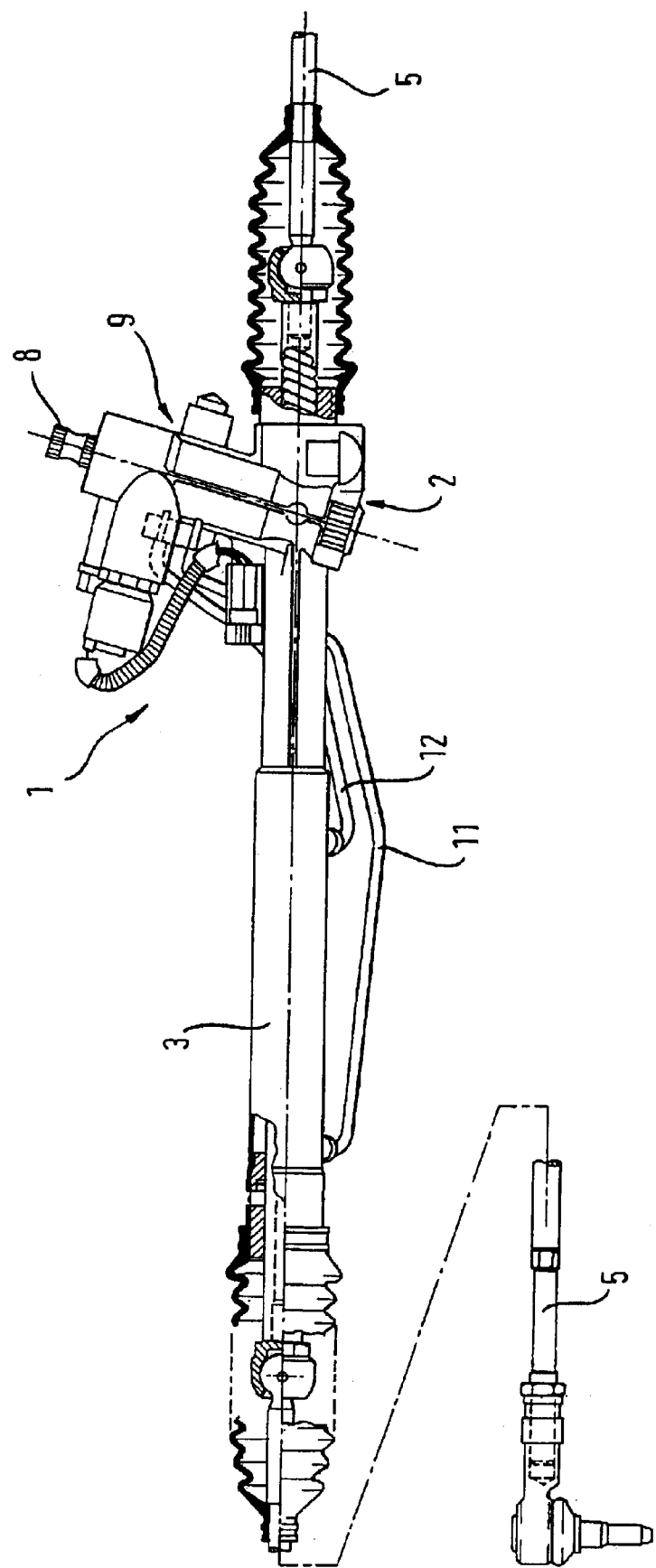
FIG. 1 shows a schematic, partly sectional view of a power steering system.

FIG. 1 shows a power steering system 1 which is mounted on a mechanical rack-and-pinion steering 2. The power steering system is supplied with a hydraulic fluid by a pump not represented in the Figure and serves to reduce the torque required for actuating the rack-and-pinion steering in that a power assistance is provided. For this purpose, a servo cylinder 3 is provided, the piston rod of which is connected with steering tie rods which are connected with the steerable wheels of a vehicle.

The servo cylinder 3 is of a conventional structure and has two chambers, to which the hydraulic fluid can be applied selectively via hydraulic lines 11, 12. For this purpose, a rotary slide valve 9 is used, which has an input shaft 8 as well as an output shaft 10. The input shaft 8 is usually connected with a vehicle steering wheel (not shown), and the output shaft 10 has a pinion which engages in the rack of the rack-and-pinion steering.

Figure 2:
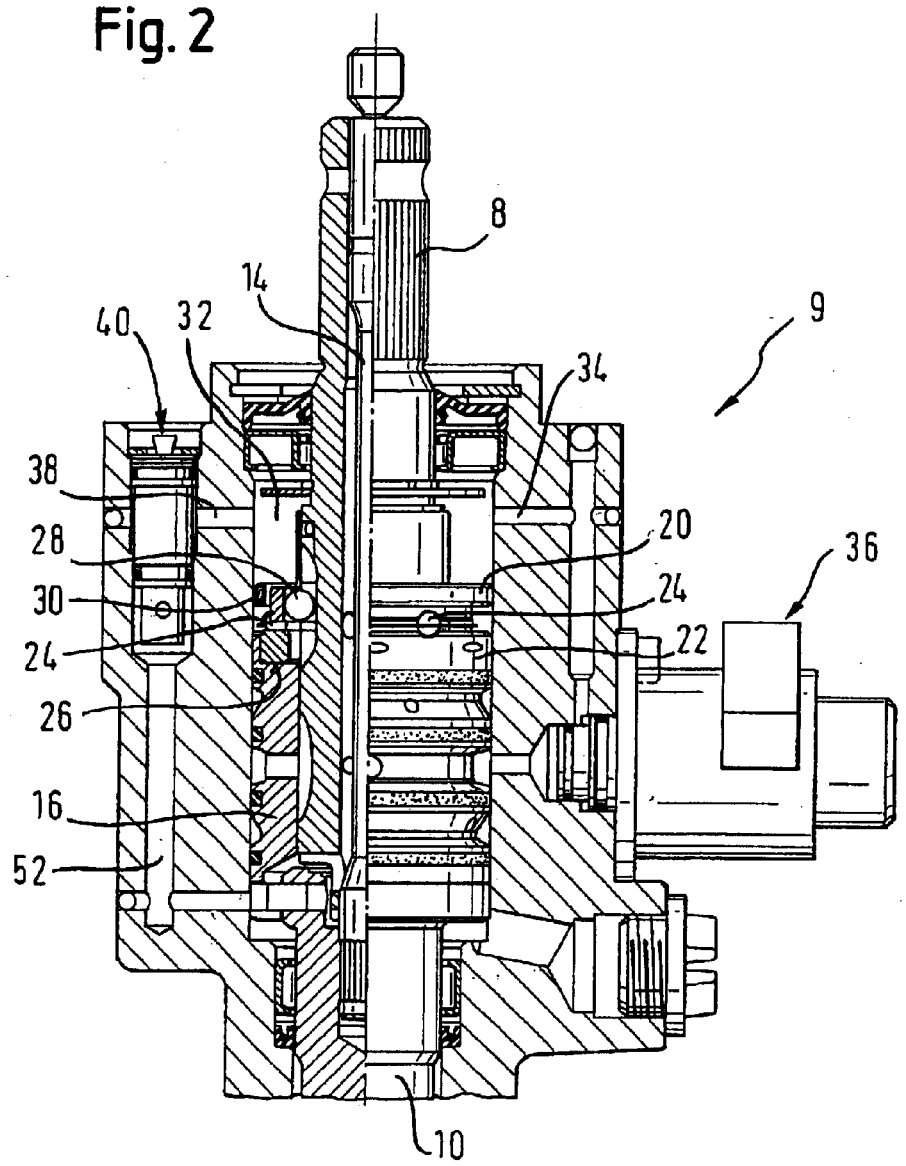
FIG. 2 shows a sectional view of the rotary slide valve according to the invention.

Disposed in the interior of the input shaft 8 is a torsion bar 14 (see FIG. 2), which at one end is non-rotatably connected with the input shaft 8 and at the other end is non-rotatably connected with the output shaft 10. Furthermore, the input shaft 8 and the output shaft 10 are connected with each other with a clearance by means of a claw coupling not shown in FIG. 2 such that they can be rotated relative to each other by a predetermined angle which lies in the order of 3 to 4 degrees. In the case of such a rotation, the torsion bar 14 is twisted, so that a restoring moment is produced which tries to return the input shaft 8 and the output shaft 10 to their starting positions.

For distributing the hydraulic fluid on the chambers of the servo cylinder, the rotary slide valve is provided with a valve sleeve 16 which is firmly connected with the output shaft 10. When the input shaft 8 and the output shaft 10 are not rotated relative to each other, hydraulic fluid is applied to none of the two chambers of the servo cylinder. However, when the input shaft 8 is rotated relative to the output shaft 10, one of the two chambers of the servo cylinder is provided with more hydraulic fluid, so that a power assistance is generated.

The basic operation of the rotary slide valve described so far is well known from prior art, for instance from the above-mentioned European patent document 0 551 619.

To be able to vary the torque which is required for a rotation of the input shaft 8 relative to the output shaft 10 and corresponds to the steering torque to be applied, a centering device is provided, which substantially comprises a centering piston 20, a centering ring 22 and a plurality of balls 24 disposed between centering piston and centering ring. The centering ring 22 is firmly accommodated in a step 26 of the valve sleeve 16 by means of a press fit and in this way non-rotatably connected with the output shaft 10. The centering piston 20 is non-rotatably connected with the input shaft 8 by a plurality of coupling balls 28, which engage in grooves in the input shaft 8 and in the centering piston and in this way non-rotatably, but axially movably connect the centering piston 20 with the input shaft 8. The centering balls 24 are disposed between V-shaped grooves in the centering piston 20 and in the centering ring 22. The centering piston 20 and the centering ring 22 are aligned relative to each other in peripheral direction such that the centering balls rest against the bottom of the groove when the input shaft and the output shaft are in the starting position relative to each other. When the input shaft and the output shaft and thus the centering piston and the centering ring are rotated against each other, the centering balls urge the centering piston away from the centering ring, as they run on the sides of the V-shaped grooves which then act as ramp surfaces.

The centering piston 20 is provided with a seal 30, so that a pressure space 32 is defined in the housing of the rotary slide valve 9. This pressure space is provided with an inlet 34, in which a flow or pressure control valve 36 is disposed. This valve serves to branch off part of the hydraulic fluid provided by the hydraulic pump, where the system pressure provided by the pump must be reduced to a suitable value.

The pressure space 32 is provided with an outlet 38, in which a cut-off valve 40 (see also FIG. 3) is disposed. The cut-off valve has a valve element 42 which is urged against a valve seat 46 by a spring 44. The valve element 42 is disposed in a guideway 48 and has a passage 50 overlapping with the guideway. The passage 50 is located downstream of the valve seat 46.

Figure 3:
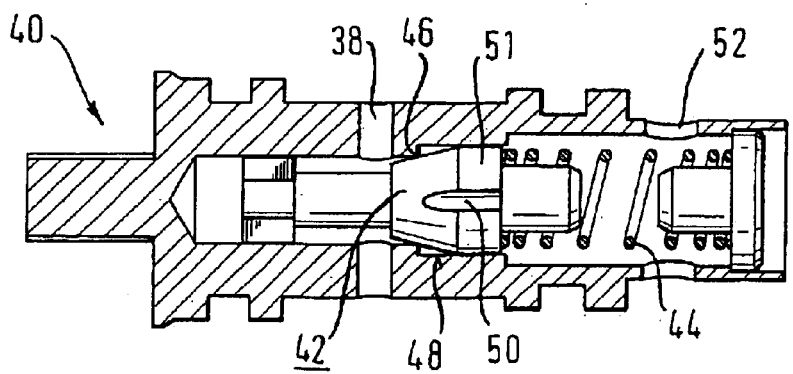
FIG. 3 shows a sectional view of a cut-off valve used in the rotary slide valve of FIG. 2.
Figure 4:
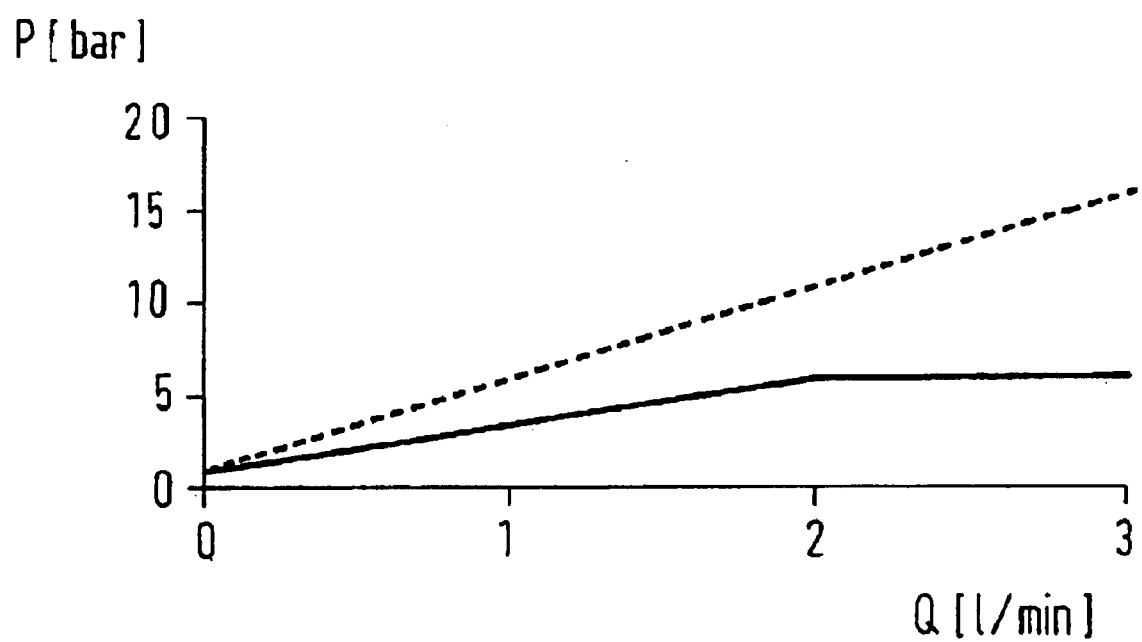
FIG. 4 shows a diagram of the characteristic of the cut-off valve shown in FIG. 3.

The cut-off valve serves to maintain a defined minimum pressure in the pre sure space 32 during the operation of the power steering system. This pressure is predetermined by the spring 44 and the cross-section of the valve scat 46 and is adjusted such that a first pressure threshold in the order of about 1 bar is adjusted. Below this pressure, the fluid in the pressure space 32 is not able to lift the valve element 42 off the valve seat 46; the outlet 38 from the pressure space 32 thus remains closed. Only when the first pressure threshold is exceeded, is the valve element 42 lifted off the valve scat 46, and the fluid can escape from the pressure space 32 through the valve seat 46 and the passage 50, and it is then supplied to a collecting tank via a return line 52. With this construction, a comparatively small change in pressure can be obtained in the pressure space 32 even with a comparatively large increase in flow rate. This is shown in FIG. 3, in which the ratio of flow rate Q and pressure P in the pressure space is plotted with a continuous line. The associated pump pressure is indicated with a broken line. When a predetermined pressure in the pressure space is exceeded, which forms a second pressure threshold and lies in the order of about 5 bar, a further increase in pressure is prevented independent of the increase in the pump pressure. This is achieved in that the valve element 42 is moved to the right with respect to FIG. 3 to such an extent that the cylindrical portion 51 of the valve element, which was previously accommodated in the guideway 48, moves out of the guideway, so that the flow rate through the cut off valve is no longer limited by the cross-section of the passage 50.

By means of this construction, a sufficient pressure is obtained in the pressure space 32 also with a central position of the power steering, so that a centering is provided by the centering piston 20 and the centering ring 22. There is not required a spring acting on the centering piston 20.

Since the above-described design allows to omit the spring which in conventional constructions acts on the pressure piston, metal bellows can now be used instead of the coupling balls as in the illustrated embodiment, in order to non-rotatably, but axially movably against a small biasing force, connect the centering piston with the input shaft 8.

Figure 5:
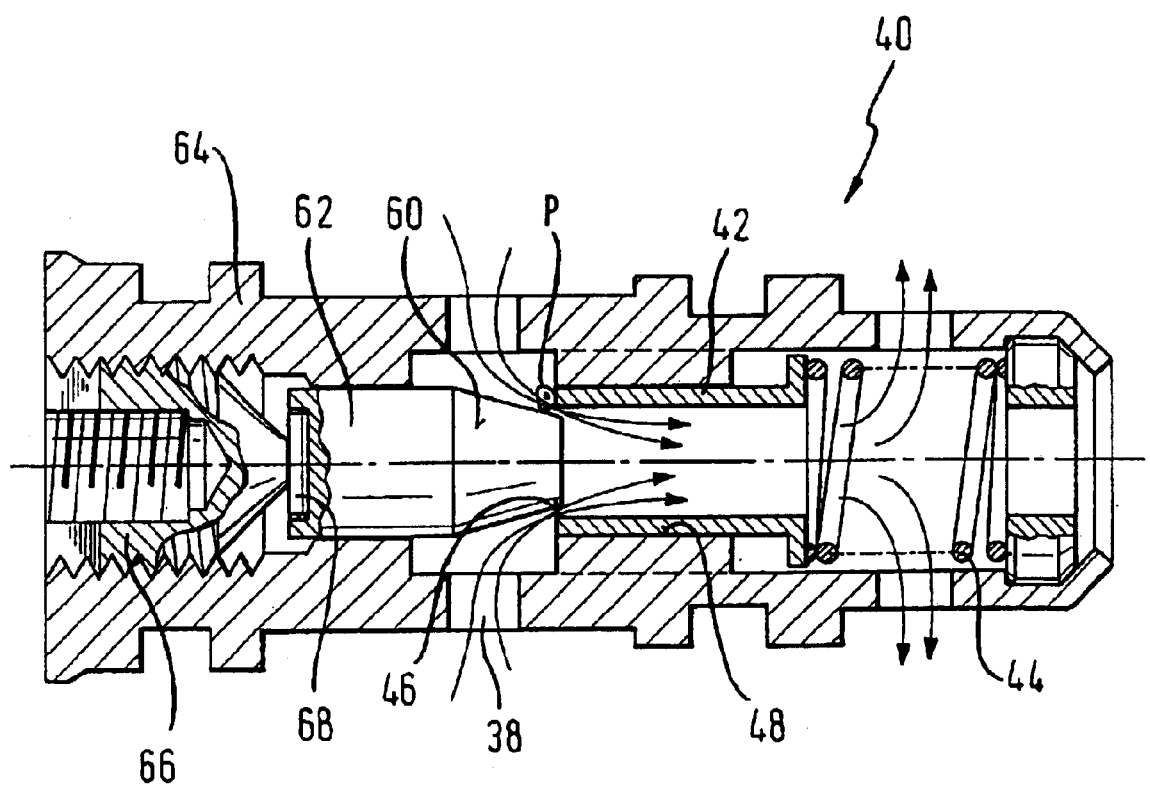
FIG. 5 shows a sectional view of an alternative embodiment of a cut-off valve used in the rotary slide valve of FIG. 2.

FIG. 5 shows a cut-off valve according to an alternative embodiment. In contrast to the valve shown in FIG. 3, the valve element according to the alternative embodiment is designed as valve sleeve 42, which is guided in a guideway 48 and is urged against a valve seat 46 by a spring 44. Here, the valve seat constitutes a conical surface 60 on a valve cone 62 which is adjustably mounted in the housing 64. For adjusting the cut-off valve, an adjusting screw 66 is provided, which acts on the valve cone 62 via an axial slide bearing 68.

The minimum pressure predetermined by the cut-off valve is predetermined by means of the adjusting screw 66, which determines the bias of the spring 44. When the minimum pressure is exceeded, the valve sleeve 42 is lifted off the valve seat, and fluid can flow out of the pressure space 32. A particular advantage of the cut-off valve shown in FIG. 5 consists in that its characteristic is comparatively insensitive to contaminations. When a dust particle (here indicated as particle P) gets caught between valve sleeve and valve seat, the cross-section between valve sleeve and valve seat is narrowed. This leads to an increase in pressure upstream of the valve seat, so that the valve sleeve is moved further to the right against the action of the spring 44. The gap between valve seat and valve sleeve is thus increased, so that either the characteristic existing prior to the dust particle getting caught is reached again or the dust particle can be discharged through the enlarged valve gap, so that then the previous conditions are obtained again.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power steering system comprising a rotary slide valve which has a housing, an input shaft and an output shaft which can be rotated relative to each other to a limited extent, a centering piston which is non-rotatably and axially movably connected with said input shaft and delimits a pressure space in said housing, a centering ring which is non-rotatably connected with said output shaft, and an inlet to said pressure space, said pressure space having a controlled outlet, wherein said outlet is provided with a cut-off valve which opens said outlet only as of a first pressure threshold which is larger than zero.

2. The power steering system according to claim 1, wherein said cut-off valve has a valve element which is urged against a valve seat by a spring, and wherein downstream of said valve seat said valve element is guided in a guideway, a passage of defined cross-section being formed between said valve element and said guideway, and said valve element being mounted such that it can be pressed out of said guideway.

3. The power steering system according to claim 1, wherein said cut-off valve has a valve sleeve which is urged against a valve seat by a spring, which valve seat is formed by a conical surface on a valve cone, and wherein downstream of said valve seat said valve sleeve is guided in a guideway.

4. The power steering system according to claim 1, wherein said inlet is provided with one of a flow and pressure control valve.

5. The power steering system according to claim 1, wherein said pressure space includes no spring acting on said centering piston.

6. The power steering system according to claim 1, wherein said centering piston is non-rotatably connected with said input shaft by a plurality of coupling balls which engage in grooves in said input shaft and in grooves in said centering piston.

7. The power steering system according to claim 1, wherein said centering piston is connected with input shaft by metal bellows.

8. The power steering system according to claim 1, wherein said centering ring is press-fitted to a valve sleeve which is connected with said output shaft.

9. A method of operating a power steering system comprising a rotary slide valve which has a housing, an input shaft and an output shaft which can be rotated relative to each other to a limited extent, a centering piston which is non-rotatably and axially movably connected with said input shaft and delimits a pressure a space in said housing, a centering ring which is non-rotatably connected with said output shaft, and an inlet to said pressure space, said pressure space having a controlled outlet, said centering piston being urged against said centering ring by a force which substantially results from a difference between a pressure in said pressure space and a return pressure on a side of said centering piston facing center balls, a cut-off valve opening said outlet from said pressure space only when said pressure in said pressure space exceeds a first pressure threshold.

10. The method according to claim 9, wherein said first pressure threshold is about 1 bar.

11. The method according to claim 9, wherein said cut-off valve completely opens said outlet when said pressure in said pressure space extends a second pressure threshold.

12. The method according to claim 11, wherein said second pressure threshold is about 5 bar.

13. Th method according to claim 9, wherein said center ring piston is designed such that with a pressure difference of 1 bar between said pressure space and a rear side of said centering piston there is achieved a torque of about 0.85 Nm between centering piston and centering ring.

* * * * *

UNITED STATES PATENT AND TRADEMARK OFFICE
CERTIFICATE OF CORRECTION

PATENT NO. : 6,929,088 B2
DATED : August 16, 2005
INVENTOR(S) : Ulrich Wienecke

It is certified that error appears in the above-identified patent and that said Letters Patent is hereby corrected as shown below:

Column 6,
Line 28, after "with" insert -- said --.
Line 38, after "pressure" delete "a".
Line 45, delete "center" and insert -- centering --.
Line 54, delete "extends" and insert -- exceeds --.
Lines 57-58, delete "center ring" and insert -- centering --.

Signed and Sealed this

Eighteenth Day of October, 2005

JON W. DUDAS
*Director of the United States Patent and Trademark Office*